United States Patent
Zimmerly

[11] Patent Number: 5,996,966
[45] Date of Patent: Dec. 7, 1999

[54] SNAP-ON VALVE GASKET

[75] Inventor: Robert D Zimmerly, Kenosha, Wis.

[73] Assignee: Tri-Clover, Inc., Kenosha, Wis.

[21] Appl. No.: 09/054,177

[22] Filed: Apr. 2, 1998

[51] Int. Cl.[6] ....................................................... F16K 1/46
[52] U.S. Cl. .......................... 251/357; 251/333; 137/240
[58] Field of Search ..................... 251/333, 357; 137/240

[56] References Cited

U.S. PATENT DOCUMENTS

| | | | |
|---|---|---|---|
| 2,920,861 | 1/1960 | Hartmann | 251/357 |
| 4,531,532 | 7/1985 | Zimmerly . | |
| 4,948,096 | 8/1990 | Alderman | 251/357 |

*Primary Examiner*—John Fox
*Attorney, Agent, or Firm*—Ryan Kromholz & Manion

[57] ABSTRACT

A sanitary valve assembly including a valve with a field replaceable gasket. The gasket is formed with an opening capable of deformation to a shape which deforms sufficiently to slide over a noncircular retaining surface of the valve head. The valve head retaining surface is provided between a pair of axially spaced laterally extending shoulders including a shoulder formed of shoulder segments separated by concave indentations. Upon passing over the shoulder, the opening in the gasket reassumes its undeflected configuration in which it engages the shoulders thus retaining the gasket on the valve stem. The gasket fits loosely on the valve head when the valve assembly is in the open position, thereby permitting the assembly to be cleaned in place by flushing washing fluid through the clearances between the valve head and gasket.

12 Claims, 2 Drawing Sheets

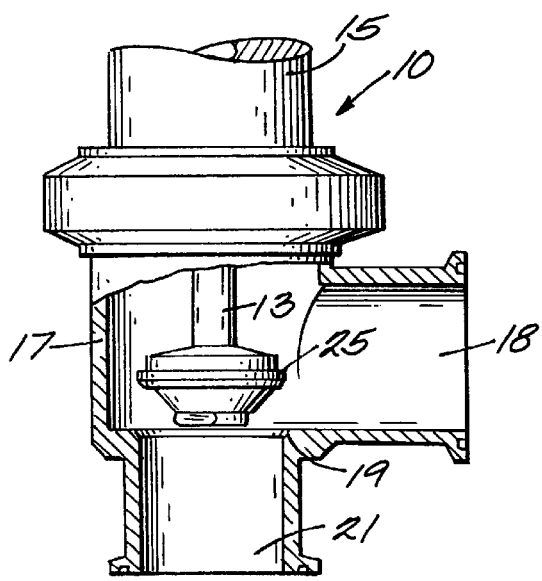
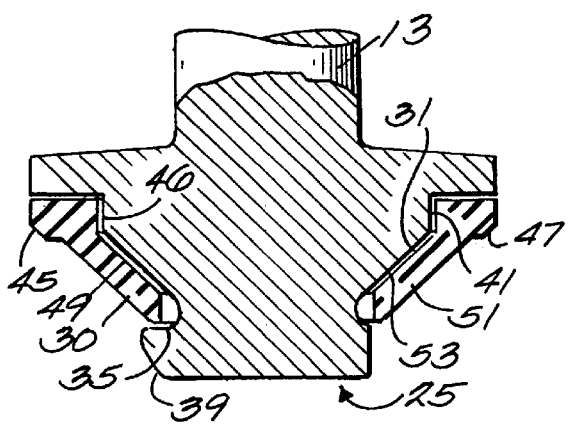
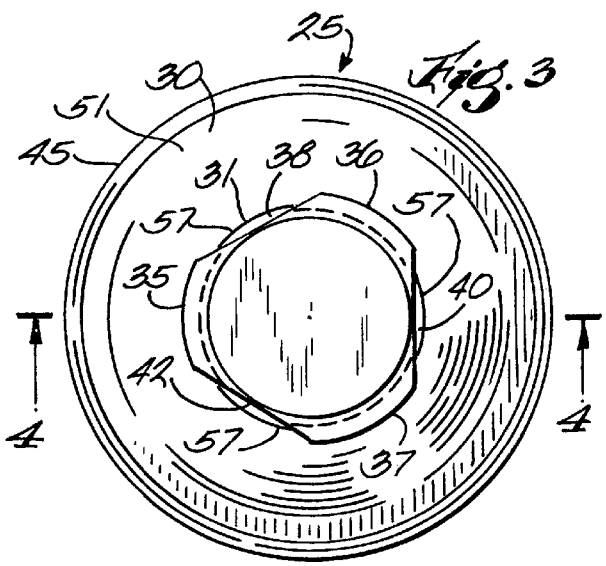
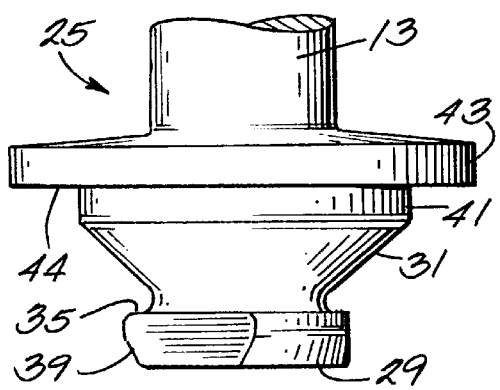
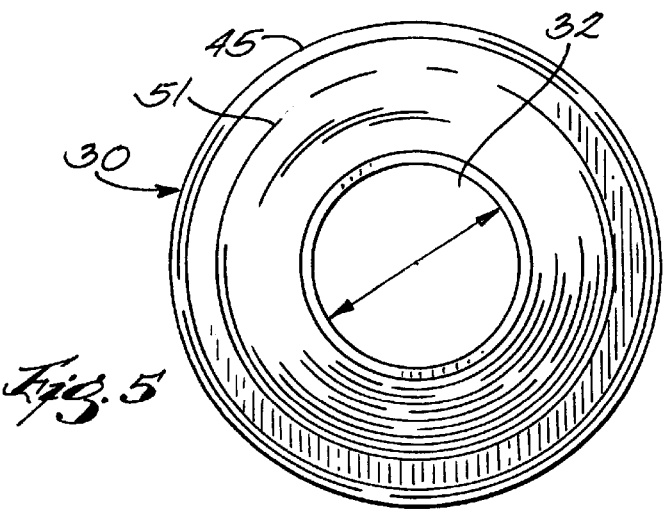

SNAP-ON VALVE GASKET

BACKGROUND OF THE INVENTION

This invention pertains to valve assemblies, and more particularly to sanitary valves having cleanable-in-place gaskets which are field replaceable.

It has long been known to equip linearly actuated valves with relatively soft gaskets for contacting a valve seat to provide a tight seal. A common feature of prior art valve gaskets was difficulty in replacing the gaskets in the field. Installation of a new rubber or other elastic facing requires stretching and drawing over relatively large projections on the valve stem.

A further problem with the aforementioned prior art valve stems and gaskets is that they are not suitable for food handling applications. Sanitary installations require the use of non-corrosive materials, such as stainless steel and certain synthetic plastics. Further, the equipment should be easily cleanable. Ease of cleaning requires the use of components having a minimum number of crevices for food particles to lodge in during operation. In addition, built-up particles must be easily flushable during cleaning. Ideally, machinery, including valve elements, for handling consumable products should be cleanable without the necessity of any disassembly and reassembly, i.e., the machinery should be cleanable with all the components in place. Many prior art valve elements contain crevices that can trap food particles, and the crevices cannot be cleaned without laborious disassembly and reassembly or the use of longer automatic cleaning cycles.

In my U.S. Pat. No. 4,531,532 I disclosed one form of such an improved assembly. A need exists for additional or alternative forms of sanitary valve assemblies which incorporate field replaceable gaskets for sealing against the valve seat and which are quickly and efficiently cleanable in place.

SUMMARY OF THE INVENTION

In accordance with the present invention, a sanitary linear valve assembly is provided which includes a field replaceable gasket for sealing against a valve seat. This is accomplished by apparatus which includes a valve stem comprising a valve stem plug and a valve stem shaft. The valve stem plug is formed with an external retaining surface which has its axis coincident with the axis of the valve stem shaft. Two axially spaced laterally extending shoulders serve to retain the replaceable gasket in place.

In my U.S. Pat. No. 4,531,532 I disclosed one form of such an improved assembly utilizing a novel gasket-valve stem configuration. The present invention provides an alternative assembly to that shown in the '532 patent which is advantageous to use in various applications. In accordance with the present invention the machining of slots required by the gasket configuration disclosed in the '532 patent is eliminated, resulting in a large manufacturing cost saving. Also, the gaskets are strengthened by the slot elimination, thus providing gaskets which are able to function over a significantly improved range of temperatures. The elimination of the slots also minimizes any cleaning difficulties which could be associated with cleaning of, for example, viscous materials from a valve.

To create a tight seal with the valve seat, a gasket of resilient plastic or elastomeric material is provided for use on the valve stem. The gasket is manufactured as an annular ring which fits loosely on a corresponding external surface of the valve stem plug, thus creating a seat assembly. The gasket is fabricated with a generally conical portion depending from one side of the annular ring. The conical portion has a central opening with an internal surface that conforms to the retaining surface of the valve stem plug. The gasket conical portion forms a hollow truncated cone which is axially retained on the valve stem plug between the two shoulders.

To allow assembly of the gasket to the valve stem, the conical portion of the gasket is formed with an opening having an inner circumference which, when deformed, is capable of sliding over the valve stem end. The end is provided with a non-circular configuration in order to provide a circumference which is reduced compared to a circular shape having the same maximum diameter. To assemble the gasket to the valve stem, the gasket is pushed onto the retaining surface of the valve stem plug, which is preferably frusto-conical in shape. The central opening of the gasket deforms to allow passage over the non-circular shoulder at the apex end of the valve stem plug retaining surface. The opening then returns to its undeflected circular shape, thus retaining the gasket between the two shoulders.

The present invention also adapts the replaceable valve stem/gasket assembly to sanitary applications. For that purpose, the gasket and valve stem plug are dimensioned so that the gasket fits loosely on the valve stem plug and is capable of both axial and lateral movement relative thereto. When the seat assembly is closed against the valve seat, the gasket is firmly pressed against the valve stem plug to create a tight seal. However, when the valve stem is opened, clearances are created between corresponding retaining surfaces and shoulder portions of the gasket and valve stem plug. The valve plug end is also configured so that a space is provided between the plug end and the inside diameter of the gasket allowing axial fluid flow into this space. This allows a washing fluid to be flushed through the clearances of the open valve to flush out food particles that lodged in the components during normal operation.

To enhance the flushing operation, an external circumferential surface of the valve stem plug and corresponding gasket ring internal surface diverge in the same direction as the valve stem plug and gasket conical surfaces. This results in an increased flow path between the gasket and valve stem plug for washing fluid. Also the valve stem end is preferably cut concavely so that openings are provided for axial flow of washing fluids into the gasket central opening. Consequently, the valve assembly can be cleaned in place, which eliminates non-productive disassembly and reassembly time.

Other objects and advantages of the invention will become apparent from the claims, drawings and detailed description.

BRIEF DESCRIPTION OF THE DRAWINGS

FIG. 1 is a fragmentary side view, partly in section, of one form of a fluid control apparatus incorporating a sanitary valve assembly of the present invention, showing the valve assembly in the open position;

FIG. 2 is a fragmentary side view, partly in section, of a sanitary valve stem of the present invention;

FIG. 3 is an end view of the stem-sanitary gasket assembly in accordance with a preferred embodiment of the present invention;

FIG. 4 is a fragmentary sectional view taken along lines 4—4 of FIG. 3;

FIG. 5 is an end view of a gasket separate from the valve seat;

DETAILED DESCRIPTION OF THE INVENTION

Figure 6:
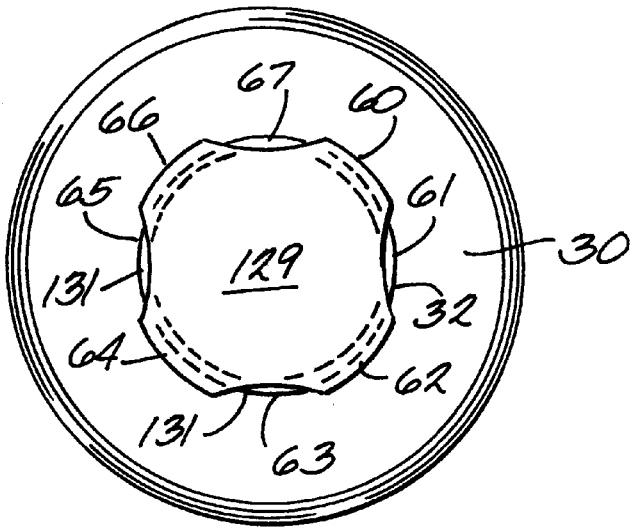
FIG. 6 is an end view of a stem-sanitary gasket assembly of the present invention showing a modified embodiment; and, FIG. 7 is an end view of the stem-sanitary gasket assembly of the present invention showing another modified embodiment.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, a fluid control valve 10 is illustrated which includes the present invention. The valve finds particular usefulness in handling liquid and viscous food products and beverages. However, it will be understood that the invention is not limited to sanitary applications.

The control valve 10 includes an actuator (not shown). The lower end of a bonnet portion 15 is detachably assembled to a valve body portion 17 having ports 18 and 21. A design for assembling the motor, bonnet, and valve body of the control valve, which do not constitute a part of the present invention, is described in U.S. Pat. No. 3,110,471.

The bonnet 15 guides the valve stem shaft 13 of the seat assembly 25 of the present invention. The seat assembly 25 is actuated in a linear direction along the longitudinal axis of the valve stem shaft 13.

In FIG. 1, the valve is shown in the open position so that fluid entering port 21 may flow out of port 18. The seat assembly 25 includes a valve stem 13, FIG. 2, and a gasket 30. The gasket is positioned on the valve stem 13 as illustrated in FIGS. 3 and 4. The valve stem 13 usually includes a separate shaft (not shown) in accordance with conventional practice for attachment to an actuator.

In the illustrated embodiment, the valve stem plug end 29 is constructed with a retaining surface 31 having its axis coincident with the axis of valve stem shaft 13. Surface 31 is generally conically surfaced at an angle of approximately 450 towards its apex end. To retain the gasket 30 on the valve stem end 29, a series of shoulder segments 35, 36, and 37 extend laterally from the apex end of surface 31. The surfaces 39 of these segments are preferably not perpendicular to the valve stem axis; but instead slope in the same general direction as surface 31. The base end of the tapered surface 31 terminates in an external circumferential surface 41. Preferably surface 41 is not cylindrical, but rather it tapers about 5° in the general direction of surface 31. To cooperate with shoulder segments 35, 36 and 37 for retaining the gasket on the valve stem and to support the gasket when it is pressed against the valve seat 19, a shoulder 43, having surface 44 generally perpendicular to the valve axis, extends laterally from the upper end of sloped surface 41.

Concave indentations 38, 40 and 42 divide the stem end 29 into the segments 35, 36, 37 in the illustrated embodiment. The concave configuration of indentations 38, 40 and 42 enables flow of fluids in an axial direction into the space between the inner diameter of central opening 32 of gasket 30. As will be appreciated by those skilled in the art, however, the indentations can be of various configurations, such as straight line cuts at regular intervals around the periphery of stem end 29. The concave configuration is preferred, however, because this configuration is both easy to clean and enables greater fluid flow, thus providing for optimum flushing of the space between the inner surface 53 of the gasket 30 and surface 31. Gasket 30 can readily be installed over stem end 29 by deformation of the central opening 32, thus allowing sufficient stretching of the gasket to enable it to slide over the retaining segments 35, 36 and 37.

To suit the application of the present invention to sanitary applications, the choice of materials is important. Thus, a preferred material for the valve is a stainless steel, such as type 316 stainless steel.

Further, in accordance with the present invention, the valve 10 includes a field replaceable gasket 30. One suitable material for sanitary applications is a PTFE plastic. Elastomer gaskets of a harder durometer are also suitable as are composite materials, for example, gaskets formed of layers of hard and soft elastomers. The gasket 30 is constructed with an annular ring 45 of generally rectangular cross-section. Ring internal surface 46 is sloped to correspond with the valve stem plug 41. To contact and provide a seal with tapered valve seat 19, the gasket ring is provided with an external chamfer 47.

The gasket 30 is formed with a central opening 32 and a hollow retaining section 49 which extends from one end of the ring 45. The section 49 is defined by generally parallel external and internal surfaces 51 and 53, respectively. Inner surface 53 corresponds to valve stem conical surface 31.

To provide retention of the gasket 32 on the valve stem plug 25, the opening 32 is of a diameter lesser than that of the outer perimeter of a circle drawn around shoulder segments 35, 36, 37.

To assemble the gasket 30 to the valve stem 25, the valve stem head 29 is manually inserted through the gasket ring 45 until the valve stem chamfer 39 strikes the internal surfaces 53. Then, as the gasket is pushed into further engagement with the valve stem, the opening 32 is deflected outwardly to allow the opening 32 to pass over shoulder segments 35, 36, 37. Tilting of the ring 30 assists in the installation process. The gasket 30 snaps back to its undeflected position when in place as seen in FIGS. 3 and 4. The gasket is then retained during use between shoulders 35,36, 37 and 43.

A gasket, may be easily replaced in the field. The old gasket is cut from the valve stem, as with a knife, and a new gasket can be assembled to the original valve stem without the use of special tools and with a minimum of expense and inconvenience. In use, the gasket-stem combination of this invention performs similarly to that shown in my '532 patent.

The present invention is also concerned with in-place cleaning of the valve seat assembly. That is accomplished by dimensioning the valve stem plug 25 and gasket 30 such that when the valve is in the open position, the gasket fits loosely on the valve stem plug. The gasket is capable of both axial and lateral movement with respect to the valve stem plug, because the distance between the retaining shoulders 35, 36, 37 and 43 is slightly greater than the length of the gasket. The designed clearances between the gasket and valve stem plug and openings 38, 40 and 42 provide a path for washing fluid that is flushed through the valve assembly during cleaning. Thus, any food particles that adhered to the seat assembly during normal operation may be removed without non-productive disassembly and reassembly of the control apparatus or the valve assembly.

Figure 7:
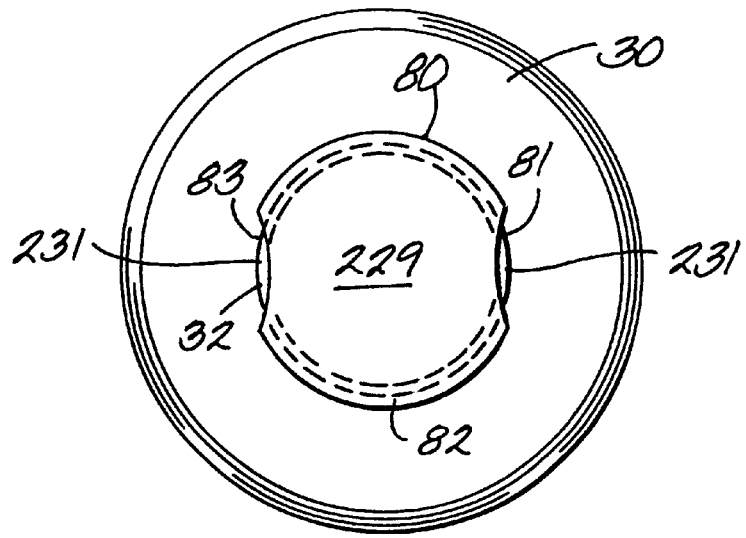

Referring to FIGS. 6 and 7 there are shown embodiments utilizing different configurations for the retaining shoulders at the distal ends 129 or 229 of the valve stem together with the indentations separating the same. In FIG. 6 four shoulder segments 60, 62, 64, and 66 are shown. These segments are separated by concave indentations 61, 63, 65 and 67 as illustrated. The openings formed by the indentations allow an axial flow path for cleaning liquid to impinge directly on a conical surface 131 which is similar to above-described surface 31 of the embodiments shown in FIGS. 2–5.

A still further embodiment is shown in FIG. 7 wherein a valve stem end 229 includes two shoulder segments 80 and 82 separated by two indentations 81 and 83. The conical retaining surface 231 shown exposed for axial flow of cleaning fluid is similar to surface 31 of FIGS. 2–5. In each of the cases illustrated in FIGS. 6 and 7 the gasket 30 with its circular opening 32 can be deformed sufficiently to allow placement over the stem ends 129 and 229 respectfully. Other stem end orientations having as many as 8–10 shoulder segments can also be utilized as needed. The number of shoulders preferred is somewhat dependent upon the diameter of the stem. For example, with a stem end 229 having a diameter of approximately 1 inch the two segments shown in FIG. 7 are suitable. The embodiment shown in FIGS. 2–5 has been found particularly applicable to valve stems in which the stem end 29 has a diameter of approximately 1.5 to 3 inches. Larger diameter ends are more suitable for use of a greater number of shoulder segments.

It is apparent from the foregoing that there has been provided, in accordance with the invention, a sanitary valve having a field replaceable gasket that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A valve stem plug and gasket assembly comprising:

(a) a valve stem plug having first and second axially spaced peripheral shoulders for retaining the gasket therebetween, said first peripheral retaining shoulder having a noncircular configuration which comprises a plurality of shoulder segments separated by indentations, (b) a gasket having an opening which has a circumference of a size adapted to slide over said first peripheral retaining shoulder when in a deflected condition to facilitate assembly, and being returnable to an undeflected condition wherein it is retained between said shoulders, said opening having a diameter less than that of the outer periphery of said shoulder segments.

2. The valve stem plug and gasket assembly of claim 1 wherein said first peripheral shoulder is adjacent to an end of said valve stem.

3. The valve stem and gasket assembly of claim 2 wherein the valve stem plug is formed with a generally conically shaped retaining surface interposed between the shoulders, and wherein the gasket opening is located in a central conically depending portion of said gasket which is generally parallel to the valve stem plug retaining surface.

4. The valve stem and gasket assembly of claim 1 wherein said first peripheral retaining shoulder comprises 2 to 10 shoulder segments separated by indentations.

5. The valve stem and gasket assembly of claim 3 wherein the retained gasket fits loosely in axial and lateral directions on the valve stem plug.

6. The valve stem and gasket assembly of claim 5 wherein the base of the valve stem plug retaining surfaces terminate in external surfaces which taper in the same general direction as the retaining surface, and wherein the gasket is formed with an annular ring having a cooperating internal tapered surface.

7. The valve stem and gasket assembly of claim 4 wherein said first retaining surface comprises arcuate segments separated by concave indentations.

8. Fluid control apparatus comprising:

a housing having inlet and outlet ports and a valve seat;

a valve stem disposed within the housing, the valve stem having first and second axially spaced peripheral shoulders thereon, said first peripheral shoulder having a noncircular configuration formed of shoulder segments with an outer periphery having a first circumference;

a gasket interfitting and retained on the valve stem between the first and second shoulders for engaging the valve seat, said gasket having an opening which has a circumference less than that of said first circumference and being adapted to pass over the first retaining shoulder when in a deflected condition to facilitate assembly to a position wherein it is retained between said shoulders; and means for linearly actuating the valve stem and gasket to sealingly engage and disengage the valve seat, so that fluid flow through the apparatus may be blocked or permitted.

9. The fluid control apparatus of claim 8 wherein the valve seat is tapered, and wherein the gasket is formed with a chamfer to sealingly engage the valve seat.

10. The fluid control apparatus of claim 8 wherein the valve seat is flat, and wherein the gasket is formed with a flat surface to sealingly engage the valve seat.

11. The fluid control apparatus of claim 8 wherein the valve stem includes a valve stem plug and a valve stem shaft, the valve stem plug being formed with a retaining surface interposed between the first and second shoulders, and wherein the gasket opening conforms to the valve stem plug retaining surface.

12. The fluid control apparatus of claim 11 wherein:

(a) the base end of the valve stem plug retaining surface terminates in an external surface that tapers in the same general direction as the retaining surface;

(b) the gasket comprises an annular ring having a tapered internal surface conforming to the valve stem plug external tapered surface; and (c) the gasket fits loosely on the valve stem plug in the axial and lateral directions when the gasket is not in engagement with the valve seat to create clearances between the gasket and valve stem plug including axially open indentations between said shoulder segments, so that flushing of said control apparatus allows cleaning in place of the gasket and valve stem plug.

* * * * *